(12) United States Patent
Ding et al.

(10) Patent No.: US 12,455,458 B2
(45) Date of Patent: Oct. 28, 2025

(54) HIGH EFFICIENCY WAVEGUIDE-BASED NEAR-EYE DISPLAYS

(71) Applicant: University of Central Florida Research Foundation, Inc., Orlando, FL (US)

(72) Inventors: Yuqiang Ding, Orlando, FL (US); Qian Yang, Orlando, FL (US); Zhiyong Yang, Orlando, FL (US); Shin-Tson Wu, Orlando, FL (US)

( * ) Notice: Subject to any disclaimer, the term of this patent is extended or adjusted under 35 U.S.C. 154(b) by 0 days.

(21) Appl. No.: 19/009,442

(22) Filed: Jan. 3, 2025

(65) Prior Publication Data

US 2025/0224611 A1 Jul. 10, 2025

Related U.S. Application Data

(60) Provisional application No. 63/617,799, filed on Jan. 5, 2024.

(51) Int. Cl.
*G02B 27/00* (2006.01)
*G02B 27/01* (2006.01)

(52) U.S. Cl.
CPC .. *G02B 27/0172* (2013.01); *G02B 2027/0123* (2013.01)

(58) Field of Classification Search
CPC ........ G02B 27/0172; G02B 2027/0123; G02B 27/01; G02B 27/0101; G02B 27/0103; G02B 27/0149; G02B 27/017; G02B 27/0176; G02B 27/0179; G02B 27/0189; G02B 2027/0105; G02B 2027/0109; G02B 2027/0107; G02B 2027/011; G02B 2027/0112; G02B 2027/0114; G02B 2027/0116; G02B 2027/0118; G02B 2027/012; G02B 2027/0121; G02B 2027/0125; G02B 2027/0127; G02B 2027/0129; G02B 2027/013; G02B 2027/0132; G02B 2027/0134; G02B 2027/0136; G02B 2027/0138;

(Continued)

(56) References Cited

U.S. PATENT DOCUMENTS

| | | | |
|---|---|---|---|
| 7,181,108 B2 | 2/2007 | Levola | |
| 12,282,163 B2 * | 4/2025 | Li | G02B 27/0081 |
| 2017/0235142 A1 * | 8/2017 | Wall | G02B 5/26 |
| | | | 359/633 |
| 2024/0061247 A1 * | 2/2024 | Moon | G02B 27/0172 |
| 2024/0427075 A1 * | 12/2024 | Glik | G02B 6/0016 |

OTHER PUBLICATIONS

Cholewiak, S. A., Başgöze, Z., Cakmakci, O., Hoffman, D. M., & Cooper, E. A. (2020). A perceptual eyebox for near-eye displays. Optics Express, 28(25), 38008-38028.

(Continued)

*Primary Examiner* — Henry Duong
(74) *Attorney, Agent, or Firm* — Fleit Intellectual Property Law; Jose Gutman (57) ABSTRACT

Systems and methods to improve efficiency of in-coupling electromagnetic waves, such as in a visible light wavelength range, into a waveguide system arrangement are disclosed. The waveguide system includes: a display or an illumination assembly; a waveguide substrate; a polarization volume grating or a spin-dependent bifacial metasurface as in-coupler, which efficiently couples electromagnetic waves, such as in a visible light wavelength range, into the waveguide substrate. An out-coupler can couple the electromagnetic waves, such as in a visible light wavelength range, out of the waveguide substrate.

19 Claims, 9 Drawing Sheets

(58) Field of Classification Search
CPC ...... G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC .......................................................... 359/630
See application file for complete search history.

(56) References Cited

OTHER PUBLICATIONS

Xiong, J., Yin, K., Li, K., & Wu, S. T. (2021). Holographic optical elements for augmented reality: principles, present status, and future perspectives. Advanced Photonics Research, 2(1), 2000049.

Goodsell, J., Xiong, P., Nikolov, D. K., Vamivakas, A. N., & Rolland, J. P. (2023). Metagrating meets the geometry-based efficiency limit for AR waveguide in-couplers. Optics Express, 31(3), 4599-4614.

Ding, Y., Yang, Q., Li, Y., Yang, Z., Wang, Z., Liang, H., & Wu, S. T. (2023). Waveguide-based augmented reality displays: perspectives and challenges. eLight, 3(1), 24.

* cited by examiner

HIGH EFFICIENCY WAVEGUIDE-BASED NEAR-EYE DISPLAYS

CROSS-REFERENCE TO RELATED APPLICATIONS

N/A

FEDERALLY SPONSORED RESEARCH AND DEVELOPMENT

N/A

FIELD OF THE INVENTION

The present disclosure generally relates to the improvement of efficiency in waveguide-based in-coupling and propagation of light in a waveguide assembly. More particularly, the present disclosure is directed to efficient in-coupling of circular polarized light into, and propagation in, a waveguide substrate. The proposed system finds applications in a variety of fields, including but not limited to virtual-reality displays, augmented-reality displays, near-eye displays, head-mounted displays, head-up displays, illumination systems, and other optical systems such as optical couplers or light modulator devices.

BACKGROUND OF THE INVENTION

Waveguide-based displays enable near-eye displays, such as used by virtual-reality (VR) systems and augmented-reality (AR) systems. Although the waveguide-based displays can dramatically shrink the form factor of the near-eye display system, the low efficiency of waveguide combiners, especially diffractive waveguide combiners, is the major blame. As modern wireless head-mounted displays are powered by batteries, such a low light efficiency imposes a significant challenge, limiting the continuous operation time.

One of the main reasons stems from the light leakage at the in-coupling grating. When a traditional diffractive grating, such as surface relief grating (SRG) or volume holographic grating (VHG), is used as an in-coupler, the waveguide combiner suffers from significant light loss because of multiple interactions between the incident light and the in-coupler, especially at the extreme field of view (FoV). This further degrades the uniformity through the whole FoV. The light leakage dramatically decreases the uniformity and the ambient contrast ratio of the virtual images.

In particular, if the width W of the in-coupler is arranged to be larger than 2d tan θ, where d is the thickness of the waveguide and θ is the minimum TIR (total internal reflection) angle of the light inside of the waveguide, then the in-coupling light will interact with the in-coupling grating two or more times. To achieve a continuous eyebox, the width W must be larger than 2d tan θ. Otherwise, the user may not see digital information in some region through the eyebox. Therefore, even if we can decrease the width W of the in-coupler by increasing the collecting power of the collimation lens or shrinking the emission cone of the display panels, the TIR angle or the waveguide thickness will be decreased to maintain the continuity through the eyebox. In this case, the efficiency loss and poor uniformity through FoV will always be serious.

More specifically, Jeremy Goodsell, et al. "Metagrating meets the geometry-based efficiency limit for AR waveguide in-couplers," Opt. Express 31, 4599-4614 (2023) indicated that the second interaction is a symmetric process of the first interaction, thus almost all light experiencing the second interaction will be coupled out the waveguide or change propagation direction if diffraction efficiency is 100%. Therefore, achieving a high and uniform in-coupling efficiency through the whole FoV and keeping the eyebox continuous becomes very challenging for waveguide displays.

To mitigate this issue, one of the most straightforward solutions is to increase the index of the waveguide substrate, so that the angular range (or FoV) from display will be smaller inside the waveguide substrate. However, once the angular range, or the FoV, gets larger, the efficiency loss gets more serious again. Besides, Levola, Tapani, "Method and optical system for coupling light into a waveguide." U.S. Pat. No. 7,181,108. 20 Feb. 2007 proposed to use a compensation layer to adjust the polarization state onto the in-coupler before the second interaction happens. However, this method will face a very challenging fabrication requirement for the waveguide display system.

Therefore, it would be highly desirable to have a way around the above-described tradeoffs between in-coupling efficiency and continuity of eyebox.

SUMMARY OF THE DISCLOSURE

According to various example embodiments of the invention, novel solutions are proposed for getting around the trade-off between in-coupling efficiency and eyebox. Various embodiments make it possible to enhance optical efficiency and improve uniformity at the same time while keeping continuity through eyebox.

Certain embodiments are especially suitable to be used for various beam expansion purposes, for example, in augmented reality (AR) and virtual reality (VR) display systems. Various configurations of embodiments may also be used in illumination systems, and other optical couplers, and similar applications.

Various embodiments can utilize novel polarization properties of polarization volume grating (PVG) structures to enhance the optical efficiency and improve the uniformity of propagated light in a waveguide arrangement.

Figure 5:
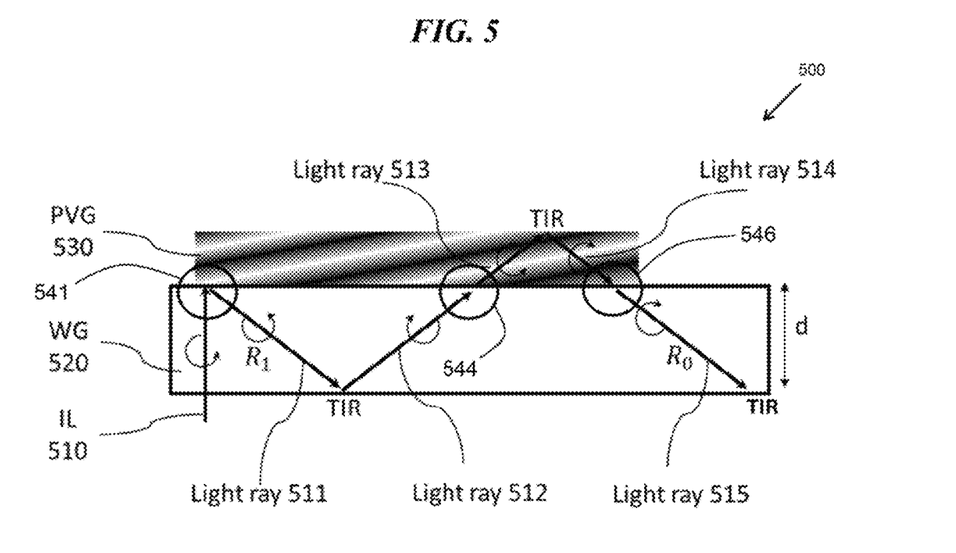
FIG. 5 depicts the details of PVG working as an in-coupler, according to an example of the present disclosure.
Figure 8A:
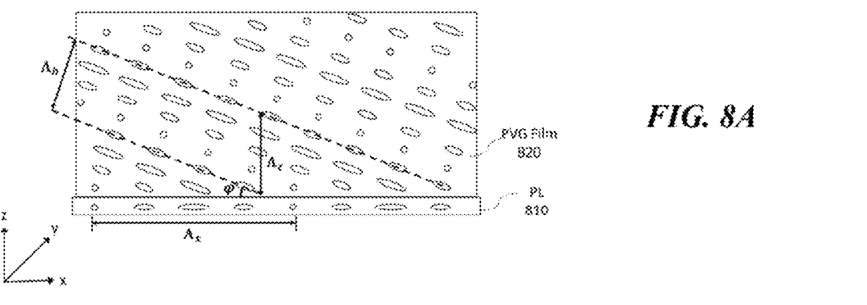
FIGS. 8A and 8B depict examples of possible structures of PVG suitable for use in FIG. 5 as part of an in-coupler arrangement, according to various examples of the present disclosure.

PVG is a polarization-type holographic optical element that records the polarization information of interfering beams composed of right-handed circularly polarized (RCP) and left-handed circularly polarized (LCP) lights. As shown in FIG. 8A, PVG exhibits a slanted cholesteric liquid crystal (CLC) structure, where the LC directors rotate along the helical axis. Unlike those traditional diffractive gratings, PVG used as an in-coupling grating can dramatically enhance the in-coupling efficiency due to its superior polarization control. Due to the CLC structure, PVG follows the polarization-selectivity rule of CLC. It selectively reflects the circular polarization state with the same handedness as the helical twist of the CLC, while transmits the orthogonal polarization state, e.g., diffracting LCP light while transmitting RCP light. However, we recently discovered a new phenomenon that does not follow the above rule. As shown in FIG. 5, when the incident angle is close to the Bragg plane during the second interaction, PVG functions as a half-wave plate, altering the polarization state of light, e.g., converting LCP light to RCP light when the half-wave condition is satisfied. As illustrated in FIG. 5, following TIR on top of the PVG, the RCP light becomes LCP due to the reverse of propagation direction. It then passes through the PVG and propagates inside the waveguide without changing its propagation direction due to the polarization selectivity of PVG.

Consequently, the in-coupling efficiency and uniformity is significantly improved while keeping the eyebox continuity.

Another embodiment uses a spin-dependent bifacial metasurface grating to enhance the in-coupling efficiency. As shown in FIG. 9B, each unit of the spin-dependent bifacial metasurface works as a transmissive phase element for one circular polarization state, e.g., RCP, and operates as a reflective polarizer for the opposite circular polarization state, LCP, on one surface. On the contrary, it works as a transmissive phase element for LCP and operates as a reflective polarizer for RCP on another surface. By modulating the phase of each unit in a periodic structure, the spin-dependent bifacial metasurface can work as a grating. As illustrated in FIG. 10, the incident RCP light will be coupled into waveguide and then becomes LCP light after the first interaction with the spin-dependent bifacial metasurface. Afterwards, it is reflected towards the spin-dependent bifacial metasurface for the second time because of TIR and becomes RCP light due to the reversed propagation direction. The RCP light will be successively reflected into waveguide during the second interaction based on the working principle of the spin-dependent bifacial metasurface. Thus, the in-coupling efficiency will be improved while keeping the continuity of eyebox. However, there is a phase shift during TIR process, and the circular polarization state may not reverse completely, so a fully reflective mirror could be laminated on the opposite side of the waveguide substrate to help this process.

Features and advantages of the above-described various embodiments will become readily apparent from the following description and accompanying drawings. Certain preferred embodiments of the invention and their benefits will also become more apparent to a person of ordinary skill in the art through the description and selected examples given herein below, and through the appended claims.

All references, publications, patents, and patent applications, cited herein and/or cited in any accompanying Information Disclosure Statement (IDS), are hereby incorporated herein by reference in their entirety for all purposes.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to illustrate various examples and to explain various principles and advantages all in accordance with the present disclosure, in which.

DETAILED DESCRIPTION

As required, detailed embodiments are disclosed herein; however, it is to be understood that the disclosed embodiments are merely examples and that the devices, systems, and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

Non-Limiting Definitions

The terms "half-wave condition", "half-wave plate condition", or "half-wave plate phase-retardation condition", or the like, are intended to mean herein, with regards to a high-efficiency polarization volume grating (PVG) optically coupled with a waveguide substrate, a specified thickness of the PVG which is approximately equal to, within a specified wavelength range, a half wavelength of a circular polarized light incident, at an incident angle close to the Bragg plane, onto a surface of the PVG. Under the above conditions including the specified thickness of the PVG, the PVG functions as a half-wave plate altering the polarization of the circular polarized light that passes through the PVG and propagates inside the waveguide substrate without changing its propagation direction due to the polarization selectivity of the PVG. For example, the PVG under the above conditions can convert the polarization of a right-handed circularly polarized (RCP) light to a left-handed circularly polarized (LCP) light, and vice versa.

As used herein regarding the PVG and the spin-dependent bifacial metasurface, the terms "interaction", "interact", or the like, are intended to mean herein a light ray from inside the waveguide directly impinges on the PVG (as shown in FIG. 5), or directly enters the waveguide from the spin-dependent bifacial metasurface or from inside the waveguide directly impinges on the spin-dependent bifacial metasurface (as shown in FIG. 10).

As used herein, the terms "transparent substrate", or "transparent and planar waveguide substrate", or the like, are intended to mean herein a substrate structure that is permeable to electromagnetic radiation (EMR) of a specified wavelength range, e.g., blue visible light to red visible light wavelength range. The substrate structure may also comprise a waveguide substrate that propagates EMR, e.g., light, along the inside of the waveguide substrate.

A transparent substrate does not necessarily have to be transparent to all electromagnetic radiation wavelength ranges. For example, and not for limitation, it can be transparent to certain specified wavelength range(s), e.g., green visible light to red visible light, while being opaque to another wavelength range outside of the certain specified wavelength range(s). For example, it might be opaque to certain light wavelength range(s) with shorter wavelengths than the certain specified wavelength range(s) of green visible light to red visible light.

As used herein, "vertical" refers to a direction perpendicular to a surface of a substrate structure, such as perpendicular to a planar surface of a waveguide structure. As used herein, "horizontal" refers to a direction parallel to a surface of a substrate structure, such as horizontal to a planar surface of a waveguide structure.

As used herein, the terms "waveplate", "half-wave plate", "half-wave retarder", or the like, are intended to mean an optical device that alters the polarization state of a circular polarized light wave travelling through it. The behavior of a waveplate depends on the thickness of the high-efficiency polarization volume grating (PVG), the wavelength of the circular polarized light, and the variation of the index of refraction. By appropriate choice of the relationship between these parameters, it is possible to introduce a controlled phase shift between two polarization components of a light wave, thereby altering its polarization.

Introduction

Near-eye display systems, and more specifically waveguide-based displays, including a small form factor, a large field of view (FoV), and a large eyebox, are becoming very much in demand. Waveguide-based displays enable near-eye displays, such as used by virtual-reality (VR) systems and augmented-reality (AR) systems, which generally must be lightweight and have a slim form factor, while keeping high optical performance. Various embodiments of the present invention dramatically improve the efficiency of light in-coupling and propagation in waveguide-based displays in near-eye display systems, which have suffered from low efficiency of waveguide combiners, especially diffractive waveguide combiners, and particularly from light leakage at the in-coupling grating of the waveguide assemblies.

Figure 1:
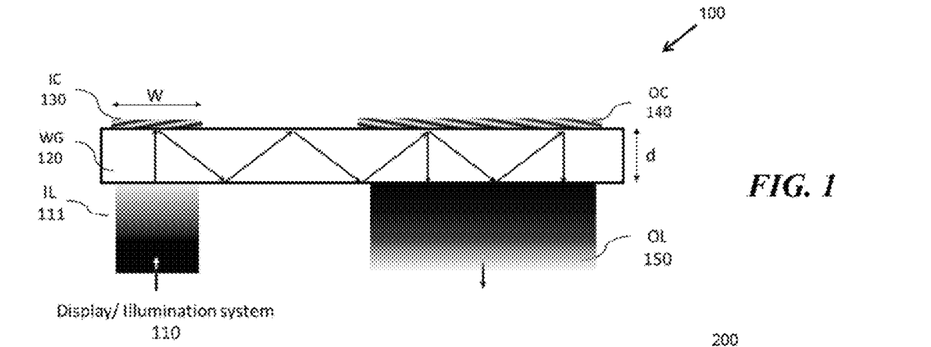
FIG. 1 schematically illustrates an example beam expansion system composed of a conventional reflective in-coupler and a reflective out-coupler arranged on a transparent and planar waveguide substrate.

FIG. 1 schematically illustrates a beam expansion system 100 composed of a conventional reflective in-coupler IC 130 and a reflective out-coupler OC 140 arranged on a transparent and planar waveguide substrate WG 120. In this system, the incident light IL 111 from a display or illumination system 110 is coupled into WG 120 and propagates inside the WG 120. Once the light encounters OC 140, it will be coupled out of WG 120. Output light OL 150 may go towards human eyes for a head-mounted display or go towards other optical elements for an illumination system. In some embodiments, the beam expansion system may include more than one in-coupler, more than one out-coupler and an extra turning coupler to realize 2-dimensional pupil expansion. In certain embodiments, the out-coupler may be a transmissive coupler. In some embodiments, the system may have multiple waveguide substrates.

Figure 2:
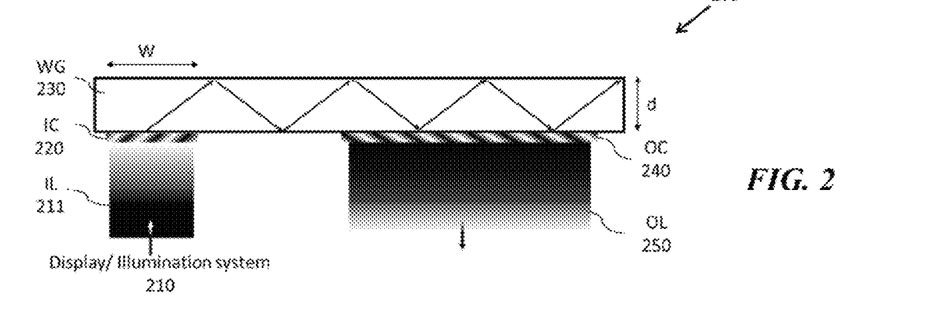
FIG. 2 schematically illustrates an example beam expansion system composed of a conventional transmissive in-coupler and a transmissive out-coupler arranged on a transparent and planar substrate.

FIG. 2 schematically illustrates a beam expansion system 200 composed of a conventional transmissive in-coupler IC 220 and a transmissive out-coupler OC 240 arranged on a transparent and planar substrate WG 230. In this system, the incident light IL 211 could be from a display assembly or an illumination system 210. In some other examples of the present disclosure, the beam expansion system may include more than one in-coupler, more than one out-coupler and an extra turning coupler to realize 2-dimensional pupil expansion. In various other examples of the present disclosure, the out-coupler may be a reflective coupler. The out-coupler, as an example, may include a type of gratings, mirror, or partial mirror array, which couple light out of the waveguide substrate. In some examples, the system may have multiple waveguide substrates.

The display assembly or illumination system in FIG. 1 and FIG. 2 can be a conventional LCD (liquid crystal display), an OLED (organic light-emitting diode) display, mini-LED backlit LCD, an LCOS (liquid-crystal-on-silicon) display, a micro-LED display, a digital light processing (DLP) projector, a laser scanning display, a LED array or other display and illumination components as known in the art. The display component outputs or is adapted to output a polarized light (virtual) image. Typically, display components such as LCD and LCOS displays produce polarized outputs. If the display output is not inherently polarized, as produced by, e.g., a micro-LED display, an OLED display, or a fiber scanning display, a polarizer and a waveplate will be disposed on the output side of the display component as known in the art to generate a desired polarization state of the output light.

Figure 3:
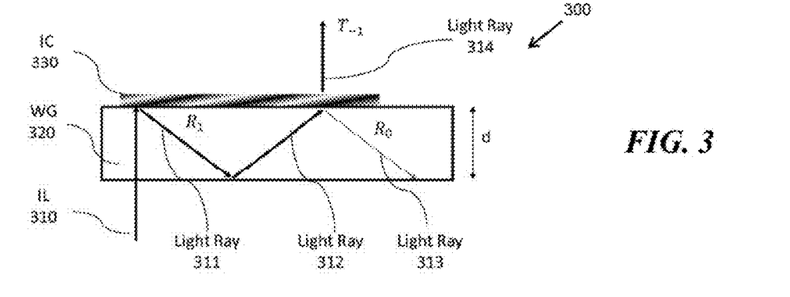
FIG. 3 illustrates schematically the first and second interactions of the incident light upon the conventional reflective in-coupler based on FIG. 1.

FIG. 3 illustrates, in a beam expansion system 300, schematically the first and second interactions of the incident light IL 310 upon the conventional reflective in-coupler IC 330 based on FIG. 1, according to an example of the present disclosure. At the first interaction, the IL 310 is deflected to a large propagation angle by the first order diffraction $R_1$ of the IC 330. Due to total internal reflection, light ray 311 is reflected toward the IC 330 at the boundary of waveguide substrate WG 320. So light ray 312 experiences the second interaction with the IC 330. During the second interaction, a big portion of light ray 314 will be coupled out the WG 320 by the first order diffraction $T_{-1}$ of the IC 330, and only a small portion of the light ray 313 will continue propagating inside the WG 320 by the zero-order diffraction $R_0$ of the IC 330. In some examples of the present disclosure, the light may be wasted through other diffraction orders, e.g., $R_{-1}$.

Figure 4:
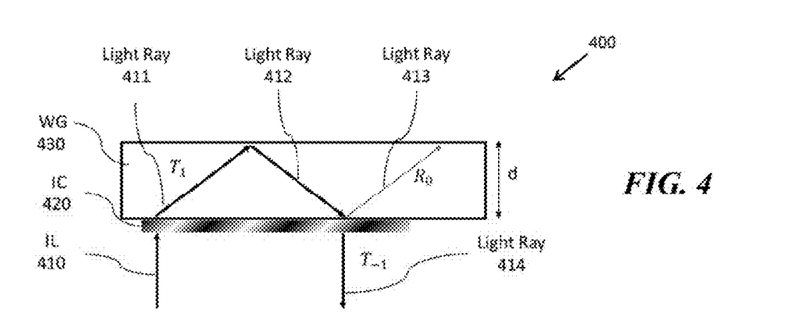
FIG. 4 illustrates schematically the first and second interactions of the incident light upon the conventional transmissive in-coupler based on FIG. 2.

FIG. 4 illustrates, in a beam expansion system 400, schematically the first and second interactions of the incident light IL 410 upon the conventional transmissive in-coupler IC 420 based on FIG. 2, according to an example of the present disclosure. At the first interaction, the IL 410 is deflected to a large propagation angle by the first order diffraction $T_1$ of the IC 420. Due to total internal reflection, light ray 411 is reflected toward the IC 420 at the boundary of waveguide substrate WG 430. So light ray 412 experiences the second interaction with IC 420. During the second interaction, most of light ray 414 will be coupled out the WG 430 by the first order diffraction $T_{-1}$ of the IC 420, and only a small portion of light ray 413 will continue propagating inside the WG 430 by the zero-order diffraction $R_0$ of the IC 420. In another example, the light may be wasted through other diffraction orders, e.g., $R_{-1}$.

Such a severe optical loss causes a serious problem to conventional couplers, such as surface relief gratings, volume holographic gratings, even in some isotropic metasurface devices, and must be solved by the device itself. Here, as described in FIG. 5, we discover a new phenomenon in PVG during the second interaction that helps solve this issue in essence.

FIG. 5 depicts, in a beam expansion system 500, the details of PVG working as an in-coupler, according to an example of the present disclosure. The incident right-handed circularly polarized (RCP) light (also referred to as counterclockwise circular polarization) light 510 is deflected into the waveguide substrate WG 520 after the first interaction 541 with PVG 530 by the first diffraction order $R_1$. Based on the selectivity rule of PVG 530, the deflected light ray 511 is also RCP light. After the first total internal reflection (TIR), according to the example, light ray 512 becomes a left-handed circularly polarized (LCP) light 512 (also referred to as clockwise circular polarization light) due to the reversed propagation direction. During the second interaction 544 with the PVG 530, the light experiences a polarization conversion without changing its propagation direction, i.e., the light ray 513 becomes RCP light if the half-wave condition is satisfied. After another TIR at the boundary of the PVG 530, the light ray 514 becomes LCP light, and is transmitted through the PVG 530 due to the polarization selectivity of PVG 530. Finally, the LCP light 514 exits 546 at the boundary of the PVG 530 and the continuing LCP light ray 515 can propagate inside the WG 520 while maintaining the propagation direction, and thereby continue propagation inside the WG 520 such as by TIR. Therefore, as illustrated in this example, both in-coupling efficiency and uniformity are improved simultaneously.

Figure 6A:
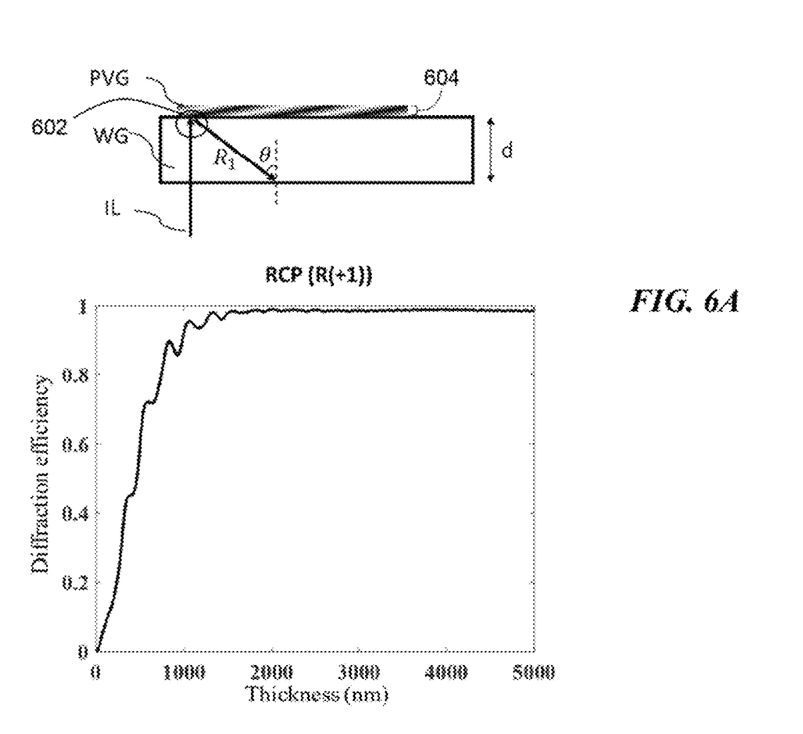
FIG. 6 illustrates the simulated diffraction response of PVG as a function of PVG thickness.
Figure 6B:
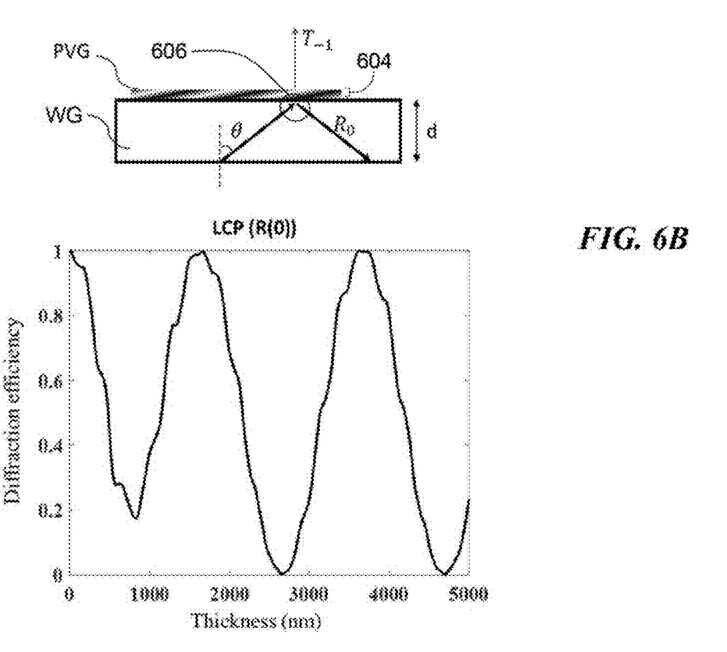

FIGS. 6A and 6B illustrate the simulated diffraction response of PVG as a function of its thickness 604 for two corresponding incident angles at a certain horizontal period (e.g., normal incidence and −50.6° at a horizontal period of 430 nm), according to an example of the present disclosure. Because the PVG is a CLC-based device, the diffraction efficiency $R_1$ will gradually saturate for the incident LCP light, as the thickness of PVG 604 exceeds about 10 pitches as shown in FIG. 6A. This is beneficial to the second interaction 606 (see FIG. 6B) because we could optimize the thickness 604 to satisfy the half-wave condition for the second interaction 606 process (e.g., the circular polarization conversion of the light ray propagating in the PVG) and keep a high diffraction efficiency for the first interaction 602. As FIG. 6B shows, the diffraction response $R_0$ of PVG at incident angle −50.6° oscillates sinusoidally when the PVG thickness 604 is larger than a certain number. Such a result is simulated in the example at an incident light wavelength $\lambda=532$ nm. Here, the input wavelength (e.g., 532 nm) is used in FIG. 6B only as an example to elucidate the underlying operation principles while the same idea can be extended to other wavelengths.

Figure 7A:
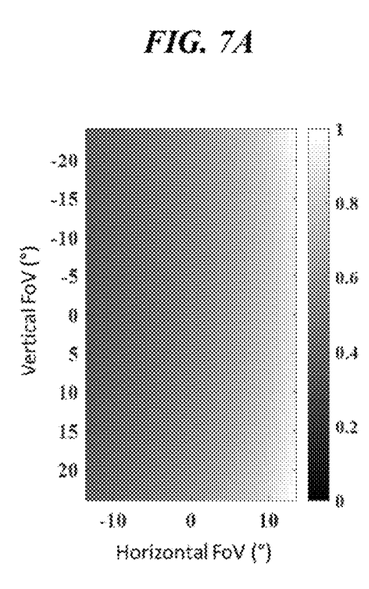
FIGS. 7A and 7B illustrate example ray-tracing simulations showing in-coupling efficiency with traditional in-coupler structure and in-coupling efficiency with PVG structure.
Figure 7B:
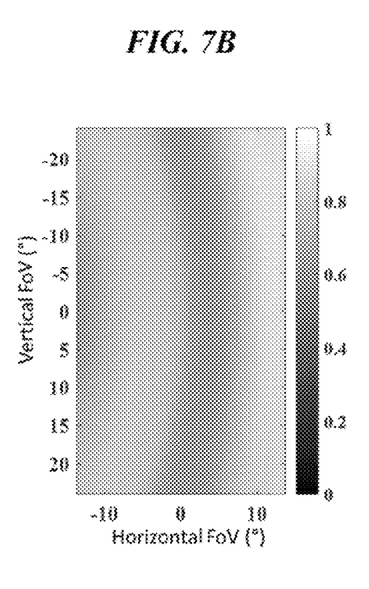

FIG. 7 illustrates the ray-tracing simulation of in-coupling efficiency with traditional in-coupler and PVG, according to an example of the present disclosure. In most cases, a single incident direction is not enough for the display or illumination systems. Therefore, here we show an example of 55° diagonal field-of-view FoV (27°×48°) in a waveguide display. Such system, according to the example, has a 4-mm entrance pupil and a 0.7-mm thickness waveguide substrate with index n=1.6. The in-coupling efficiency for traditional in-coupler is shown in FIG. 7A. After using an optimized PVG, the in-coupling efficiency is improved from 35.4% to 60.8% as shown in FIG. 7B. As indicated in FIG. 7B, the uniformity of in-coupling efficiency is also improved after using our optimized PVG. Such a result is simulated at $\lambda=532$ nm. Here, the input (also referred to as in-coupled) light wavelength is used only as an example to elucidate the underlying operation principles while the same idea can be extended to other wavelengths.

Figure 8B:
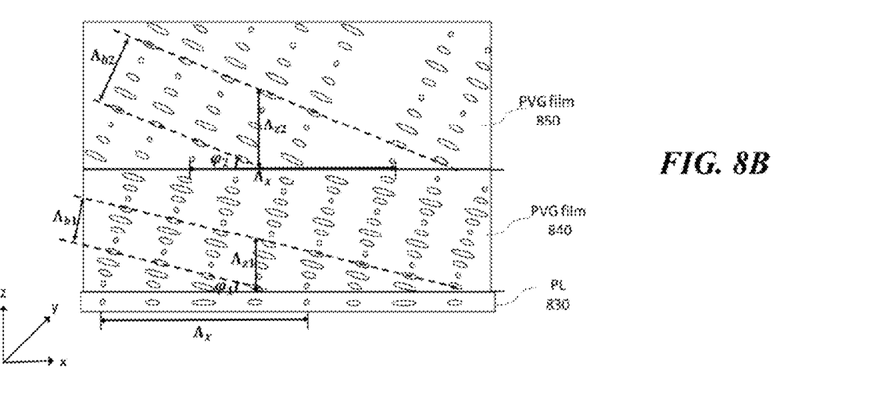

FIGS. 8A and 8B depict possible structures of the PVG optical device 530 used for improving the in-coupling efficiency as shown in FIG. 5, according to an example of the present disclosure. The PVG may also be referred to as a PVH (polarization volume hologram). As shown in the example of FIG. 8A, the PVG optical device 820 may comprise a single-layer film on a photoalignment layer PL 810 with a horizontal period $\Lambda_x$, a vertical period $\Lambda_z$, Bragg period $\Lambda_b$ and a slanted angle φ. The PVG optical device 820 may include polymerized (or cross-linked) liquid crystals (LC), polymer-stabilized LCs, photopolymers, or any combination thereof. The LCs may include nematic LCs, twist-bend LCs, chiral nematic LCs, smectic LCs, or any combination thereof.

As shown in the example of FIG. 8B, the PVG optical device may include two or multi-layer films on a photoalignment layer PL 830. The first vertical period $\Lambda_{z1}$ in the first PVG film 840 may be configured to be same as the vertical period $\Lambda_{z2}$ in the second (other) PVG film 850. Alternatively, the first vertical period $\Lambda_{z1}$ may be configured to be different from the vertical period $\Lambda_{z2}$. The specific example of FIG. 8B shows that the first vertical period $\Lambda_{z1}$ is less than the second vertical period $\Lambda_{z2}$. Also, as shown in FIG. 8B, the first slanted angle 41, which is in the first PVG film 840, is less than the second slanted angle 42 in the second PVG film 850.

Besides, the LC molecules in the PVG film may be arranged in a 3D orientation pattern having a varying vertical period $\Lambda_z$. In various examples of the present disclosure, within the volume of PVG, between a first surface and a second surface of the PVG, the vertical pitch $\Lambda_z$ may be configured to change in a predetermined manner, such as a gradually increasing or decreasing manner, a combination of increasing and decreasing manner, etc. The gradient manner may be a linear gradient manner, a nonlinear gradient manner, a stepped gradient manner, or a suitable combination thereof.

According to the example of FIG. 8B, the first PVG film 840 can be constructed with a first thickness selected to meet a half-wave plate condition for a first wavelength range of a circularly polarized light (CPL) incident on the first PVG film 840, while the second PVG film 850 can be constructed with a second thickness selected to meet a half-wave plate condition for a second wavelength range of a CPL incident on the second PVG film 850, the second wavelength range being different from the first wavelength range. Combinations of two or more PVG films 830, 840, 850, as illustrated in the example of FIG. 8B and discussed above, can form an PVG optical device 830, 840, 850, customized to preferentially operate with a selectable plurality of separate wavelength ranges of CPL incident on the combination of two or more PVG films 830, 840, 850, according to various examples of the present disclosure. For example, and not for limitation, a waveguide assembly may include one or multiple waveguide substrates that support propagation of red, green, and blue, lights either individually or collectively. A combination of two or more PVG films 830, 840, 850, optically coupled to a surface of a waveguide substrate can provide an in-coupler for the various wavelength ranges (e.g., red, green, and blue) of in-coupled circularly polarized light incident on the combination of the two or more PVG films 830, 840, 850.

Figure 9A:
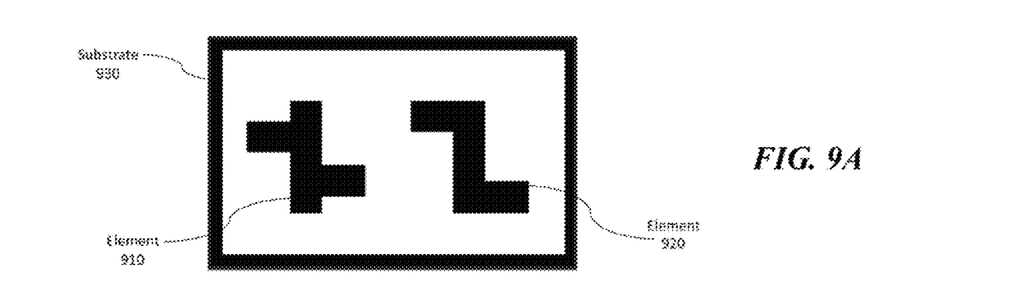
FIGS. 9A and 9B illustrate examples of structures and working principles suitable for use in a spin-dependent bifacial metasurface, according to various examples of the present disclosure.
Figure 9B:
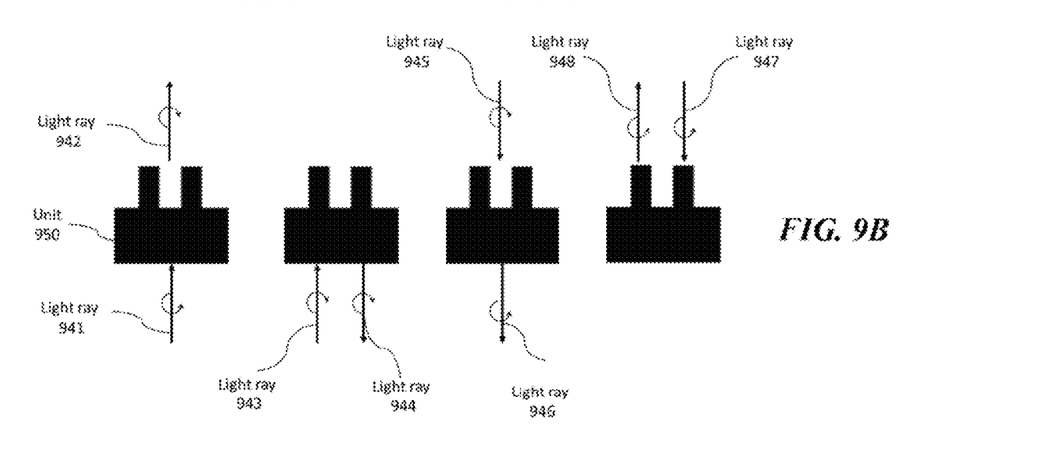
Figure 10:
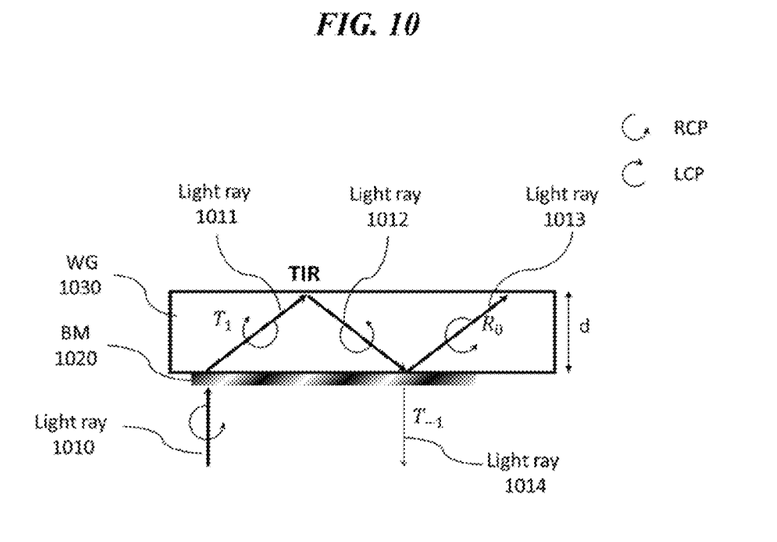
FIG. 10 depicts the details of the spin-dependent bifacial metasurface BM 920 working as an in-coupler.

FIG. 9 illustrates the structure and working principles of the spin-dependent bifacial metasurface. FIG. 9A depicts one unit of the spin-dependent bifacial metasurface. Each unit has two elements, element 910 and element 920 onto a substrate 930. Based on interference, the unit can have different functions for different polarization states on two surfaces. As shown in FIG. 9B, the incident RCP light ray 941 will transmit through unit 950 and is converted to LCP light ray 942 with a certain phase. On the other hand, the incident LCP light ray 943 will be reflected back and light ray 944 will remain to be LCP light. On another surface, the incident LCP light ray 945 will transmit through unit 950 and is then converted to RCP light ray 946 with a certain phase. On the other hand, the incident RCP light ray 947 will be reflected back and light ray 948 will remain to be RCP light. In various examples of the present disclosure, the polarization response can be reversed by a specific design.

By modulating the structure of two elements in each unit, different phases can be obtained. Therefore, a spin-dependent bifacial metasurface grating can be formed by a periodic unit with different phases.

FIG. 10 depicts the details of the spin-dependent bifacial metasurface BM 1020 working as an in-coupler, according to an example of the present disclosure. The incident RCP light ray 1010 is deflected into the waveguide substrate WG 1030 during the first interaction with the BM 1020 by the first diffraction order $T_1$. Based on the working principle of BM 1020, the deflected light ray 1011 becomes LCP light. After the first TIR, light ray 1012 becomes RCP light due to the reverse of propagation direction. During the second interaction with BM 1020, light ray 1012 is reflected by BM 1020 without changing propagation direction based on the working principle of BM 1020. Only a small portion of light ray 1014 is coupled out through the diffraction process $T_{-1}$. Finally, light ray 1013 can propagate inside WG 1030 while maintaining the propagation direction. Therefore, both in-coupling efficiency and uniformity are improved at the same time. In some examples of the present disclosure, the system may include a mirror or a partial mirror array, on the opposite side of WG 1030 to help the polarization reversion during the first TIR process.

Additionally, various non-limiting examples are summarized in the list below.

A. A waveguide apparatus in head-mounted displays or illumination systems, comprising:
a display assembly or illumination assembly;
a waveguide assembly comprising a waveguide substrate;
high-efficiency polarization volume gratings with an optimized thickness or spin-dependent bifacial metasurfaces as in-coupler disposed on the waveguide substrate; and
an out-coupler.

B. The waveguide apparatus according to any preceding listed example starting with example A, wherein the incident light is a circular polarization light.

C. The waveguide apparatus according to any preceding listed example starting with example A, wherein the circular polarization light is right-handed or left-handed circularly polarized light.

D. The waveguide apparatus according to any preceding listed example starting with example A, wherein the display assembly comprises a display component, a collimation optics system, and a circular polarizer, which converts light from the display component into circular polarization light.

E. The waveguide apparatus according to any preceding listed example starting with example A, wherein the display component comprises one or more of: an LCD, an OLED display, a mini-LED backlit LCD, an LCOS display, a micro-LED display, a laser projector, or a fiber scanning display.

F. The waveguide apparatus according to any preceding listed example starting with example A, wherein the illumination system is an LED, an OLED, a mini-LED, a micro-LED display, or a laser source.

G. The waveguide apparatus according to any preceding listed example starting with example A, wherein the light from the display component or illumination system is unpolarized or linearly polarized light.

H. The waveguide apparatus according to any preceding listed example starting with example A, wherein the circular polarizer is replaced by a quarter-wave plate.

I. The waveguide apparatus according to any preceding listed example starting with example A, wherein the polarization volume grating may have one-layer or multi-layer structure.

J. The waveguide apparatus according to any preceding listed example starting with example A, wherein the polarization volume grating may be a gradient pitch structure.

K. The waveguide apparatus according to any preceding listed example starting with example A, wherein the polarization volume gratings may have a right-handed structure or a left-handed structure.

L. The waveguide apparatus according to any preceding listed example starting with example A, wherein a mirror may be combined with the spin-dependent bifacial metasurface.

M. The waveguide apparatus according to any preceding listed example starting with example A, wherein the waveguide assembly may include one or multiple waveguide substrates.

N. The waveguide apparatus according to any preceding listed example starting with example A, wherein the waveguide substrate may be any suitable transparent material, for example glass material or plastic material.

O. The waveguide apparatus according to any preceding listed example starting with example A, wherein the out-coupler may be a grating, mirror, or partial mirror.

P. The waveguide apparatus according to any preceding listed example starting with example A, wherein the out-coupler may be composed of multiple gratings.

Q. The waveguide apparatus according to any preceding listed example starting with example A, wherein the waveguide substrate may have multiple out-couplers or extra turning couplers.

R. The waveguide apparatus according to any preceding listed example starting with example A, wherein the waveguide substrate may have multiple out-couplers or extra turning couplers.

S. A method for a waveguide assembly including a waveguide substrate and a high-efficiency polarization volume grating (PVG) optically coupled with a surface of the waveguide substrate as an in-coupler of circular polarized light (CPL) into the waveguide substrate, the PVG thickness selected to provide a half-wave plate to the in-coupled CPL incident on the PVG by matching a half-wave condition of a wavelength range of the CPL, the method comprising:
in-coupling into the waveguide substrate a right-handed or left-handed circularly polarized light (CPL), the PVG thickness having been selected to provide a half-wave plate to the CPL incident on the PVG by matching a half-wave condition of a wavelength range of the CPL;
at a first interaction with the PVG, deflecting the CPL to propagate the CPL in the waveguide substrate by total internal reflections; and
at a second interaction with the PVG, after the first interaction with the PVG, converting the circular polarization of the incident CPL without changing its propagation direction inside the PVG.

T. The waveguide apparatus according to any preceding listed example starting with example A, wherein the illumination assembly includes a light source, a lens component, and a circular polarizer which converts light from the light source into circularly polarized light.

Non-Limiting Examples

The present invention may be implemented as a system and/or a method, at any possible technical detail level of integration.

Although the present specification may describe components and functions implemented in various examples with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description and the following claims. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense. For the sake of clarity and succinctness, the components and details which are not essential in order to explain the scope of the invention have been omitted in the drawings.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, optical, wired, wireless, or other communications media. The terms "communicatively coupled" or "communicatively coupling" include, but are not limited to, communicating light signals and/or electronic control signals, by which one element may direct or control another. The term "configured to" describes one or more structures, or a combination of structures, that is set up, arranged, built, composed, constructed, designed or that has any combination of these characteristics to carry out a given function. The term "adapted to" describes one or more structures or a combination of structures that is capable of, able to accommodate, to make, or that is suitable to carry out a given function.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted herein by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The corresponding structures, materials, acts, and equivalents of all means or step plus function elements in the claims below are intended to include any structure, material, or act for performing the function in combination with other claimed elements as specifically claimed.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The description of the various embodiments of the present invention has been presented by various examples for purposes of illustration and description, but is not intended to be exhaustive or limited to the invention in the form disclosed. Many modifications and variations will be apparent to those of ordinary skill in the art without departing from the scope of the invention. The examples were chosen and described to best explain the principles of the invention and the practical application, and to enable others of ordinary skill in the art to understand the invention for various embodiments with various modifications as are suited to the particular use contemplated.

What is claimed is:

1. A waveguide assembly, comprising:
   in-coupler optically coupled to a waveguide substrate; and
   wherein the in-coupler includes at least one high-efficiency polarization volume grating (PVG) optically coupled to a surface of the waveguide substrate, a thickness of the PVG selected to satisfy a half-wave plate phase-retardation condition of an in-coupled circularly polarized (CP) light, which in response to a first interaction of an in-coupled CP light incident with the PVG the CP light deflects and propagates in the waveguide substrate, and thereafter during a second interaction of the CP light incident with the PVG the CP light experiences a circular polarization conversion without changing its propagation direction.

2. A method for a waveguide assembly including a waveguide substrate and a high-efficiency polarization volume grating (PVG) optically coupled with a surface of the waveguide substrate as an in-coupler of circularly polarized light (CPL) into the waveguide substrate, a thickness of the PVG selected to satisfy a half-wave plate condition for a wavelength range of an in-coupled CPL incident on the PVG, the method comprising:
- in-coupling into the waveguide substrate a right-handed or left-handed circularly polarized light (CPL);
- during a first interaction of the in-coupled CPL incident on the PVG, deflecting the in-coupled CPL to propagate the CPL in the waveguide substrate by total internal reflections; and
- during a second interaction with the PVG, after the first interaction with the PVG, converting a circular polarization of the CPL incident on the PVG without changing the propagation direction of the CPL.

3. A waveguide apparatus in a head-mounted display or in an illumination system, comprising:
- a display assembly or an illumination assembly;
- a waveguide assembly comprising a waveguide substrate and an in-coupler disposed on a surface of the waveguide substrate;
- one or more high-efficiency polarization volume gratings (PVG), or one or more spin-dependent bifacial metasurfaces, as the in-coupler disposed on a surface of the waveguide substrate, wherein the PVG being optically coupled to a surface of the waveguide substrate, a thickness of the PVG selected to satisfy a half-wave plate phase-retardation condition of an in-coupled circularly polarized (CP) light, which in response to a first interaction of an in-coupled CP light incident with the PVG the CP light deflects and propagates in the waveguide substrate, and thereafter during a second interaction of the CP light incident with the PVG the CP light experiences a circular polarization conversion without changing its propagation direction; and
- an out-coupler.

4. The waveguide apparatus according to claim 3, wherein light in-coupled from the display assembly or the illumination assembly comprises circularly polarized light.

5. The waveguide apparatus according to claim 3, wherein the display assembly comprises:
- a display component; and
- a circular polarizer, which converts light from the display component into circular polarization light.

6. The waveguide apparatus according to claim 3, wherein the display assembly comprises:
- a display component;
- a collimation lens; and
- a circular polarizer, which converts light from the display component into circularly polarized light.

7. The waveguide apparatus according to claim 3, wherein the illumination assembly comprises:
- a light source and a circular polarizer, which converts light from the light source into circular polarization light.

8. The waveguide apparatus according to claim 3, wherein the illumination assembly comprises:
- a light source;
- a lens component; and
- a circular polarizer, which converts light from the light source into circularly polarized light.

9. The waveguide apparatus according to claim 3, wherein the waveguide assembly includes one or multiple waveguide substrates that support propagation of red, green, and blue lights either individually or collectively.

10. The waveguide apparatus according to claim 3, wherein the waveguide substrate comprises suitable transparent material including at least one of glass material, plastic material, or a combination thereof.

11. The waveguide apparatus according to claim 3, wherein the PVG includes one layer or a plurality of layers combined in a structure, with thickness of each layer selected for achieving polarization conversion of in-coupled circularly polarized light during a second interaction with the PVG.

12. The waveguide apparatus of claim 11, wherein the waveguide assembly includes one or multiple waveguide substrates, optically coupled with a plurality of film layers combined in a structure of the PVG to support in-coupling and propagation of red, green, and/or blue, lights either individually or collectively.

13. The waveguide apparatus according to claim 3, wherein the PVG comprises a gradient pitch structure with optimized thickness selected for achieving polarization conversion during a second interaction with the polarization volume grating.

14. The waveguide apparatus according to claim 3, wherein the PVG comprises a right-handed structure or a left-handed structure.

15. The waveguide apparatus according to claim 3, wherein a plurality of polarization volume gratings is laminated on a plurality of surfaces of a waveguide substrate, and in-coupled light comprises linearly polarized light or un-polarized light.

16. The waveguide apparatus according to claim 3, wherein a mirror is combined with a spin-dependent bifacial metasurface on two surfaces of the waveguide substrate for achieving more efficient reverse polarization during reflection at a boundary of the waveguide substrate.

17. The waveguide apparatus according to claim 3, wherein the out-coupler includes a type of gratings, mirror, or partial mirror array, which couple light out of the waveguide substrate.

18. The waveguide apparatus according to claim 3, wherein the out-coupler comprises multiple gratings.

19. The waveguide apparatus according to claim 3, wherein the waveguide substrate comprises multiple out-couplers, or extra turning couplers, for 2-dimensional beam expansion.

* * * * *